United States Patent
Inagaki et al.

(10) Patent No.: US 10,155,539 B2
(45) Date of Patent: Dec. 18, 2018

(54) PARKING ASSIST DEVICE

(71) Applicant: AISIN SEIKI KABUSHIKI KAISHA, Kariya-shi, Aichi-ken (JP)

(72) Inventors: Hiroki Inagaki, Okazaki (JP); Hironori Hirata, Anjo-chi (JP); Koichi Sassa, Ichinomiya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/688,948

(22) Filed: Aug. 29, 2017

(65) Prior Publication Data
US 2018/0057056 A1    Mar. 1, 2018

(30) Foreign Application Priority Data
Aug. 31, 2016    (JP) .................. 2016-169767

(51) Int. Cl.
*B62D 15/02*    (2006.01)

(52) U.S. Cl.
CPC ....... *B62D 15/0275* (2013.01); *B62D 15/028* (2013.01); *B62D 15/0285* (2013.01); *B60R 2300/302* (2013.01); *B60R 2300/305* (2013.01); *B60R 2300/806* (2013.01); *B60R 2300/8086* (2013.01)

(58) Field of Classification Search
CPC .............. B62D 15/0275; B62D 15/028; B62D 15/0285; B60R 2300/302; B60R 2300/305; B60R 2300/806; B60R 2300/8086
See application file for complete search history.

(56) References Cited

U.S. PATENT DOCUMENTS 9,216,765 B2    12/2015    Inagaki et al.
2012/0062394 A1*    3/2012    Pampus ............... B62D 15/027
                                                                340/932.2
(Continued)

FOREIGN PATENT DOCUMENTS

JP    2014-121984 A    7/2014
JP    2014-166834 A    9/2014

OTHER PUBLICATIONS

Extended European Search Report dated Jan. 24, 2018 issued by the European Patent Office in counterpart European application No. 17186796.3.

*Primary Examiner* — Sisay Yacob
(74) *Attorney, Agent, or Firm* — Sughrue Mion, PLLC

(57) ABSTRACT

According to one embodiment, a parking assist device includes a detector configured to detect a target parking position from a captured image obtained from an imager; a position identifier that identifies, during a period while the vehicle is moving after the captured image was displayed on the display device and before a captured image captured next by the imager is displayed, the target parking position with respect to a current position of the vehicle, based on a first moving amount by which the vehicle has moved since the captured image was displayed on the display device and on a positional relation between the vehicle and the target parking position at the time when the captured image was captured; and a parking assist unit that guides the vehicle during the period based on the identified target parking position when a request for guiding the vehicle to the target parking position is made.

4 Claims, 9 Drawing Sheets

(56) References Cited

U.S. PATENT DOCUMENTS

| | | | |
|---|---|---|---|
| 2013/0166190 A1* | 6/2013 | Ikeda | B62D 15/0285 |
| | | | 701/400 |
| 2013/0229524 A1* | 9/2013 | Vovkushevsky | B60R 1/00 |
| | | | 348/148 |
| 2014/0244070 A1 | 8/2014 | Inagaki et al. | |

* cited by examiner

PARKING ASSIST DEVICE

CROSS-REFERENCE TO RELATED APPLICATIONS

This application is based upon and claims the benefit of priority from Japanese Patent Application No. 2016-169767, filed Aug. 31, 2016, the entire contents of which are incorporated herein by reference.

FIELD

An embodiment described herein relates generally to a parking assist device.

BACKGROUND

Parking assist systems have heretofore been known, in each of which a display device displays an image representing an external environment around a vehicle, and, in a manner superimposing over the image, displays a parking frame image in a target parking position serving as a target position in which the vehicle is to be parked. Techniques for such conventional parking assist systems have been developed in which the parking frame image is displayed so as to eliminate a deviation from an actual target parking position at the time of display before the target parking position is set, and thus, the parking assist is more effectively provided to a user.

Such conventional techniques are described, for example, in Japanese Patent Application Publication No. 2014-166834.

However, although the conventional techniques eliminate the deviation with respect to the displayed parking frame image when the vehicle has moved, deviations in coordinates for actually controlling to guide the vehicle are not eliminated. Hence, to improve the accuracy of the parking assist in the conventional parking assist operation, the parking assist is started on condition that the vehicle is stationary. That is, if the parking assist tries to be started while the vehicle is moving, deviations in coordinates by amounts of the movement can be additionally generated, affecting the accuracy of the parking.

SUMMARY

Thus, it is one object of the present invention to provide a parking assist device that is capable of starting the parking assist while the vehicle is moving, and is capable of improving the accuracy of the parking assist.

A parking assist device according to the embodiment comprises: a detector configured to detect a target parking position from a captured image obtained from an imager, the target parking position indicating an area allowing a vehicle to park, the imager imaging a surrounding area of the vehicle while the vehicle is moving; a display unit configured to display the captured image on a display device; a position identifier configured to identify, during a period while the vehicle is moving after the captured image was displayed on the display device and before a captured image captured next by the imager is displayed, the target parking position with respect to a current position of the vehicle, based on a first moving amount by which the vehicle has moved since the captured image was displayed on the display device and on a positional relation between the vehicle and the target parking position at the time when the captured image was captured; and a parking assist unit configured to guide the vehicle during the period based on the identified target parking position when a request for guiding the vehicle to the target parking position is made. With this configuration, for example, while the vehicle is moving, the relative position of the target parking position at the time when the captured image was captured is identified with respect to the current position of the vehicle. As a result, the parking assist can be started even while the vehicle is moving, and the accuracy of the parking assist (guidance of the vehicle) from the current position to the target parking position at the time when the captured image was captured can be improved.

In the parking assist device, the position identifier is configured to add a second moving amount by which the vehicle has moved during a processing cycle from the time when the captured image was captured until the target parking position is detected to the first moving amount to identify the target parking position. With this configuration, for example, the relative position of the target parking position with respect to the current position of the vehicle is calculated taking into account also the moving amount by which the vehicle has moved during the processing cycle for detecting the target parking position. Consequently, the accuracy of the parking assist (guidance of the vehicle) can be further improved.

In the parking assist device, the detector is configured to acquire the target parking position from the captured image captured by the imager at certain intervals while the vehicle is moving. With this configuration, for example, the surrounding state of the vehicle in motion can be accurately acquired using the captured image intermittently provided at certain intervals. The deviation in the target parking position can be corrected by arithmetic processing using the captured image during each of the certain intervals at which the captured image is provided. As a result, the arithmetic processing can be performed using the image representing the accurate surrounding state even while the vehicle is traveling, and the accuracy of the parking assist (guidance of the vehicle) from the current position to the target parking position at the time when the captured image was captured can be improved.

A parking assist device according to the embodiment comprises: a detector configured to detect a target parking position from a captured image obtained from an imager, the target parking position indicating an area allowing a vehicle to park, the imager imaging a surrounding area of the vehicle while the vehicle is moving; a display unit configured to display the captured image on a display device; a position identifier configured to identify, during a period while the vehicle is moving after the captured image was displayed on the display device and before a captured image captured next by the imager is displayed, the target parking position with respect to a current position of the vehicle, based on a second moving amount by which the vehicle has moved during a processing cycle from the time when the captured image was captured until the target parking position is detected and on a positional relation between the vehicle and the target parking position at the time when the captured image was captured; and a parking assist unit configured to guide the vehicle during the period based on the identified target parking position when a request for guiding the vehicle to the target parking position is made. With this configuration, for example, while the vehicle is moving, the relative position of the target parking position at the time when the captured image was captured is identified with respect to the current position of the vehicle. As a result, the parking assist can be started even while the vehicle is moving, and the accuracy of the parking assist (guidance of the vehicle) from the current position to the target parking position at the time when the captured image was captured can be improved.

BRIEF DESCRIPTION OF THE DRAWINGS

FIG. 1 is a perspective view illustrating a state in which a part of a passenger compartment of a vehicle equipped with a parking assist device according to an embodiment of the present invention is seen through;

DETAILED DESCRIPTION

An exemplary embodiment of the present invention will be disclosed below. The following configurations of the embodiment, and actions, results, and effects obtained by the configurations are merely examples. The present invention can also be carried out by configurations other than those disclosed in the following embodiment, and can obtain at least one of various effects and derived effects based on the basic configurations.

A parking assist device according to the present embodiment will be described by way of an example thereof mounted on a vehicle 1. In the present embodiment, the vehicle 1 may be, for example, an automobile (internal combustion engine automobile) having an internal combustion engine (engine, not illustrated) as a driving source, may be an automobile (such as an electric vehicle or a fuel cell vehicle) having an electric motor (motor, not illustrated) as the driving source, or may be an automobile (hybrid vehicle) having both of them as driving sources. The vehicle 1 can be equipped with any of various transmissions, and can be equipped with various devices (such as systems and components) needed to drive the internal combustion engine and/or the electric motor. Systems, numbers, layout, and so forth of devices related to driving of wheels 3 in the vehicle 1 can be variously set.

Figure 1:
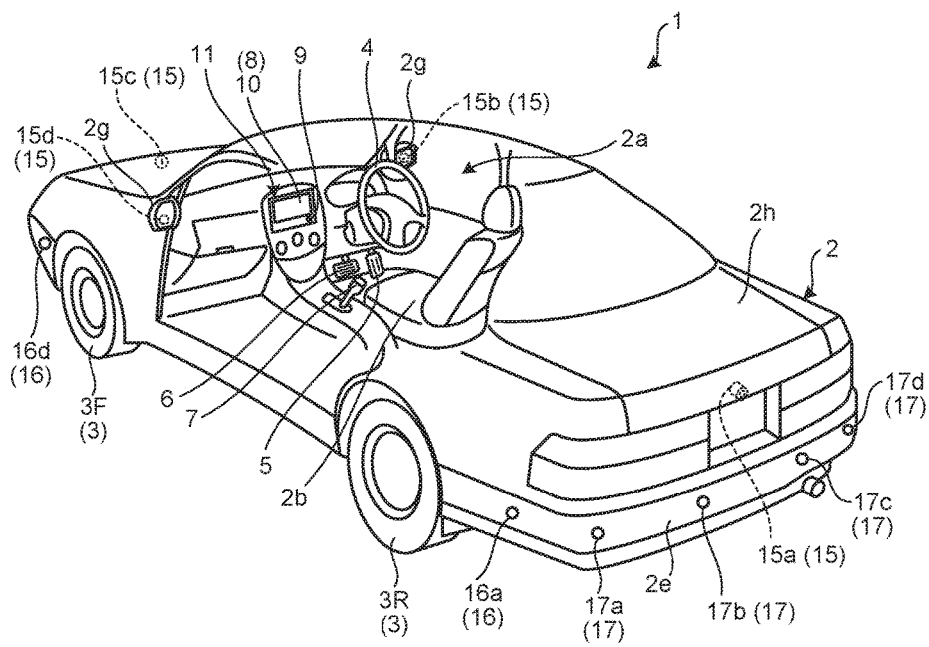

As illustrated in FIG. 1, a vehicle body 2 forms a passenger compartment 2a in which occupants (not illustrated) are seated. The passenger compartment 2a is provided therein with, for example, a steering unit 4, an acceleration operation unit 5, a brake operation unit 6, and a gear shift operation unit 7 in a manner facing a seat 2b of a driver as one of the occupants. In the present embodiment, as an example, the steering unit 4 is a steering wheel projecting from a dashboard (instrument panel); the acceleration operation unit 5 is an accelerator pedal located under a foot of the driver; the brake operation unit 6 is a brake pedal located under the foot of the driver, and the gear shift operation unit 7 is a shift lever projecting from a center console. These units are, however, not limited to this example.

The passenger compartment 2a is provided therein with a display device 8 serving as a display output unit and a voice output device 9 serving as a voice output unit. Examples of the display device 8 include a liquid crystal display (LCD) and an organic electroluminescent display (OELD). The voice output device 9 is, as an example, a speaker. In the present embodiment, as an example, the display device 8 is covered with a transparent operation input unit 10 (such as a touchscreen panel). The occupants can view a video (image) displayed on a display screen of the display device 8 through the operation input unit 10. The occupants can perform operation input (instruction input) by touching, pressing, or sweeping the operation input unit 10 with a finger or the like in a position corresponding to the video (image) displayed on the display screen of the display device 8. In the present embodiment, as an example, the display device 8, the voice output device 9, the operation input unit 10, and the like are provided on a monitoring device 11 located at the central part in the vehicle width direction (right-left direction) of the dashboard. The monitoring device 11 can include operation input units (not illustrated), such as switches, dials, joysticks, and pushbuttons. Another voice output device (not illustrated) can be provided at a location different from that of the monitoring device 11 in the passenger compartment 2a. Voices can be output from the voice output device 9 of the monitoring device 11 and the other voice output device. In the present embodiment, as an example, the monitoring device 11 is also used as a navigation system and an audio system. However, the monitoring device for the parking assist device may be provided separately from these systems.

Figure 2:
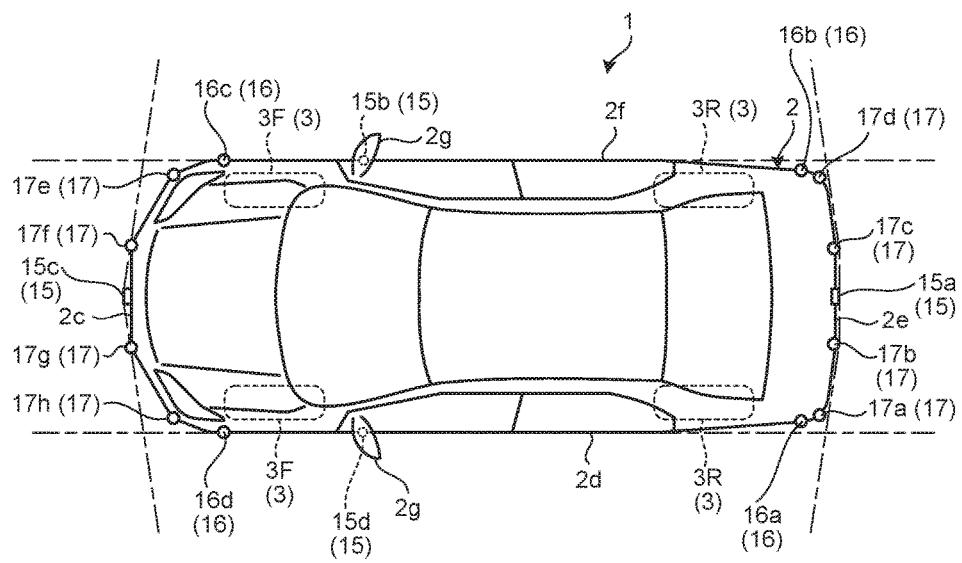
FIG. 2 is a plan view (overhead view) illustrating an example of the vehicle equipped with the parking assist device according to the embodiment.
Figure 3:
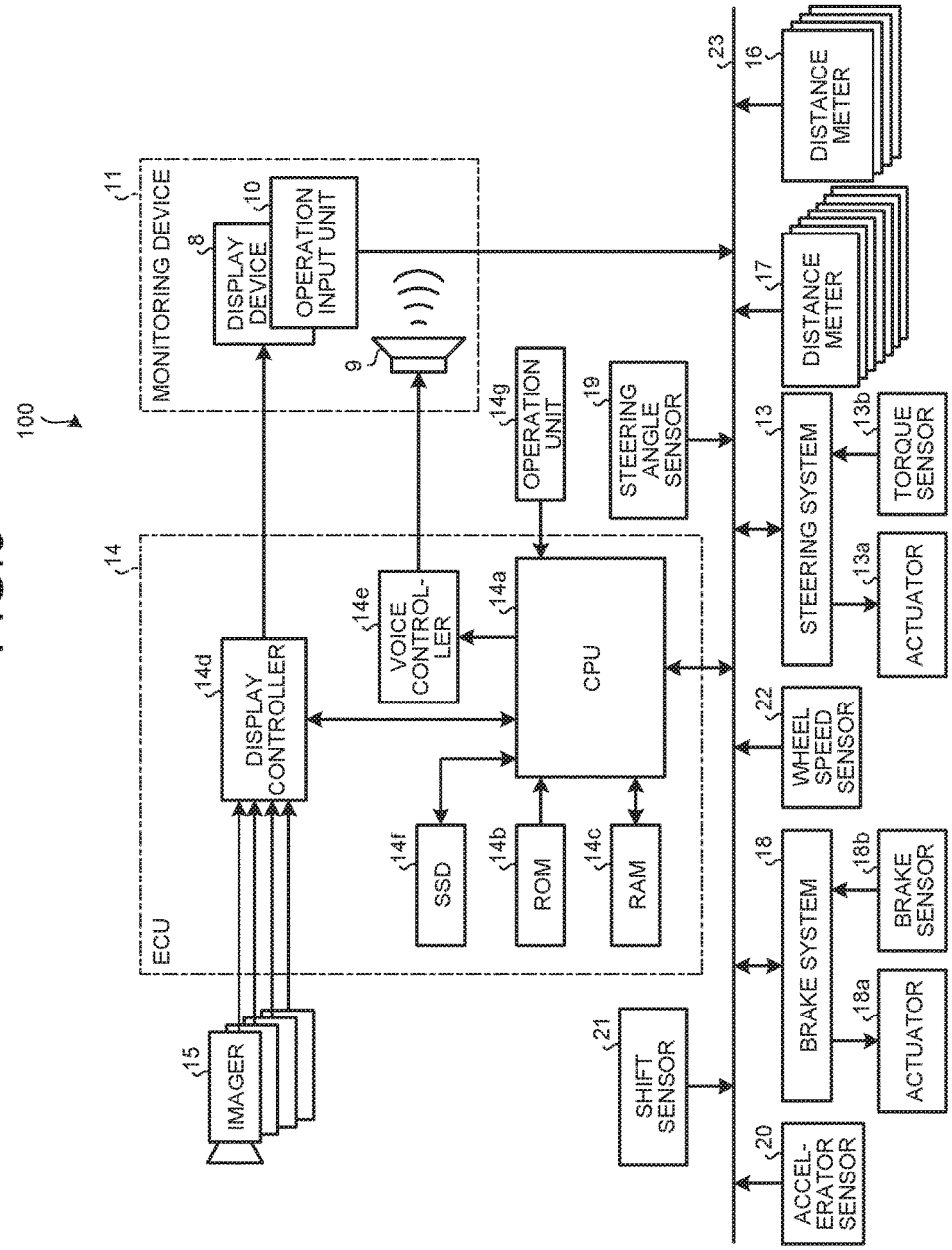
FIG. 3 is a block diagram illustrating a configuration of a control system including the parking assist device according to the embodiment.

As illustrated in FIGS. 1 and 2, in the present embodiment, as an example, the vehicle 1 is a four-wheel vehicle (four-wheel automobile), and includes two right and left front wheels 3F and two right and left rear wheels 3R. In the present embodiment, all the four wheels 3 may be configured to be capable of being steered (to be steerable). In the case of the present embodiment, as illustrated in FIG. 3, the vehicle 1 includes a steering system 13 for steering the front wheels 3F. The steering system 13 is electrically controlled by, for example, an electronic control unit (ECU) 14 to operate an actuator 13a. Examples of the steering system 13 include an electric power assisted steering system and a steer-by-wire (SBW) system. The steering system 13 applies torque (assist torque) from the actuator 13a to the steering unit 4 to supplement a steering force, or steers (automatically steers) the wheels 3. The actuator 13a may steer one of the wheels 3, or may steer more than one of the wheels 3. A torque sensor 13b detects, for example, torque applied by the driver to the steering unit 4.

As illustrated in FIG. 2, the vehicle 1 (vehicle body 2) is provided with as a plurality of imagers 15, for example, four imagers 15a to 15d. The imagers 15 are, for example, digital cameras each incorporating an image pickup device, such as a charge-coupled device (CCD) or a CMOS image sensor (CIS). The imagers 15 can output moving image data (captured image data) at a certain frame rate. Each of the imagers 15 has a wide-angle lens or a fisheye lens, and can photograph a range of, for example, 140 degrees to 220 degrees in the horizontal direction. The optical axis of the imager 15 is set obliquely downward, in some cases. With this configuration, the imagers 15 sequentially photograph the environment around the vehicle 1, including a road surface on which the vehicle 1 can move, an area allowing the vehicle 1 to park, and objects (such as obstacles, people, bicycles, and automobiles) at the periphery of such places, and output the photographed images as the captured image data.

The imager 15a is located at, for example, an end portion 2e on the rear side of the vehicle body 2, and is provided on a wall portion below a door 2h of a rear trunk. The imager 15b is located, for example, at an end portion 2f on the right side of the vehicle body 2, and is provided at a right side door mirror 2g. The imager 15c is located, for example, on the front side, that is, at an end portion 2c on the front side in the vehicle front-rear direction, of the vehicle body 2, and is provided, for example, at a front bumper. The imager 15d is located, for example, at an end portion 2d on the left side of the vehicle body 2, and is provided at a left side door mirror 2g. The ECU 14 performs arithmetic processing and image processing based on the captured image data obtained by the imagers 15, and thus can generate an image having a wider view angle or generate a virtual overhead image (plan image) of the vehicle 1 viewed from above.

The ECU 14 identifies, for example, section lines (such as white lines) marked on the road surface at the periphery of the vehicle 1 from the images captured by the imagers 15, and detects (extracts) a parking section defined by the section lines or the like.

In the present embodiment, as an example, the vehicle 1 (vehicle body 2) is provided with as a plurality of distance meters 16 and 17, for example, four distance meters 16a to 16d and eight distance meters 17a to 17h, as illustrated in FIGS. 1 and 2. The distance meters 16 (for long distances) and the distance meters 17 (for short distances) are, for example, sonars (sonar sensors or ultrasonic detectors) that emit ultrasonic waves and capture reflected waves thereof. The ECU 14 can measure the presence or absence of, and if present, the distance from, for example, an object (obstacle) located behind the vehicle 1 (vehicle body 2) based on detection results of the distance meters 17. In the same way, the ECU 14 can measure the presence or absence of, and if present, the distance from an object (obstacle) located in front of the vehicle 1 using the distance meters 17 located in front of the vehicle 1. In addition, the ECU 14 can measure the presence or absence of, and if present, the distance from an object (obstacle) located in the direction of each side face of the vehicle 1 (vehicle body 2) based on detection results of the distance meters 16.

In the present embodiment, as an example, in a parking assist system 100, for example, the ECU 14, the monitoring device 11, the steering system 13, the distance meters 16 and 17, a brake system 18, a steering angle sensor 19 (angle sensor), an accelerator sensor 20, a shift sensor 21, and wheel speed sensors 22 are electrically connected together through an in-vehicle network 23 (electric communication line), as illustrated in FIG. 3. The in-vehicle network 23 is configured as a controller area network (CAN), as an example. The ECU 14 can control, for example, the steering system 13 and the brake system 18 by transmitting control signals through the in-vehicle network 23. Through the in-vehicle network 23, the ECU 14 can receive detection results of, for example, the torque sensor 13b, a brake sensor 18b, the steering angle sensor 19 (for front wheels 3F), the distance meters 16 and 17, the accelerator sensor 20, the shift sensor 21, and the wheel speed sensors 22, and can receive instruction signals (control signals, operation signals, input signals, and data) from, for example, the operation input unit 10.

The ECU 14 includes, as an example, a central processing unit (CPU) 14a, a read-only memory (ROM) 14b, a random access memory (RAM) 14c, a display controller 14d, a voice controller 14e, and a solid state drive (SSD) 14f (flash memory). The CPU 14a can perform, for example, image processing related to an image displayed on the display device 8 and various types of arithmetic processing, such as calculation of a moving path of the vehicle 1 and determination of the presence or absence of interference with an object. The CPU 14a can read a program stored (installed) in a nonvolatile storage device such as the ROM 14b, and perform arithmetic processing according to the program. The RAM 14c temporarily stores various types of data used in the arithmetic operation performed by the CPU 14a. The display controller 14d mainly performs, for example, the image processing using the image data obtained by the imagers 15 and the image processing (synthesis as an example) on the image data displayed on the display device 8 among the arithmetic processing performed by the ECU 14. The voice controller 14e mainly performs processing on the voice data output from the voice output device 9 among the arithmetic processing performed by the ECU 14. The SSD 14f is a rewritable nonvolatile storage unit, and can store data even if the power supply to the ECU 14 is turned off. For example, the CPU 14a, the ROM 14b, and the RAM 14c can be integrated in the same package. The ECU 14 may use another logical operation processor, such as a digital signal processor (DSP), or a logic circuit, instead of the CPU 14a. A hard disk drive (HDD) may be provided instead of the SSD 14f. The SSD 14f or the HDD may be provided separately from the ECU 14.

Examples of the brake system 18 include an anti-lock brake system (ABS) that inhibits the brake from locking, an electronic stability control (ESC) that inhibits the vehicle 1 from skidding during cornering, an electric brake system that increases a braking force (performs a brake assist), and a brake-by-wire (BBW) system. The brake system 18 applies a braking force to the wheels 3 (vehicle 1) via an actuator 18a. The brake sensor 18b can detect the position of the brake pedal serving as a movable part. The brake sensor 18b includes a displacement sensor.

The steering angle sensor 19 is a sensor that detects the steering amount (rotational angle) of the steering unit 4 (the steering wheel, as an example in the present embodiment), and is constituted using a Hall element, as an example. The ECU 14 acquires from the steering angle sensor 19, for example, the steering amount of the steering unit 4 provided by the driver or steering amounts of the individual wheels 3 during the parking assist in which automatic steering is performed, and performs various types of control. If, for example, the brake operation unit 6 is operated during the automatic steering, the ECU 14 can discontinue or terminate the automatic steering, determining that the situation is unsuitable for the automatic steering. The torque sensor 13b detects the torque applied by the driver to the steering unit 4.

The accelerator sensor 20 is, for example, a sensor that detects the position of a movable part of the acceleration operation unit 5. The accelerator sensor 20 can detect the position of the accelerator pedal serving as the movable part. The accelerator sensor 20 includes a displacement sensor.

The shift sensor 21 is, for example, a sensor that detects the position of a movable part of the gear shift operation unit 7. The shift sensor 21 can detect the position of, for example, a lever, an arm, or a button serving as the movable part. The shift sensor 21 may include a displacement sensor, or may be configured as a switch. For example, the ECU 14 can start assist control when the movable part is set to a reverse position, and end the assist control when the position of the movable part is changed from the reverse position to a forward position.

The wheel speed sensors 22 are sensors that detect rotating amounts or numbers of rotations per unit time of the wheels 3. The wheel speed sensors 22 output numbers of wheel speed pulses representing the detected numbers of rotations as sensor values. The wheel speed sensors 22 can be each constituted using, for example, a Hall element. The ECU 14 calculates the speed and the moving amount of the vehicle 1 based on the sensor values acquired from the wheel speed sensors 22, and performs various types of control. The wheel speed sensors 22 are provided in the brake system 18 in some cases. In such cases, the ECU 14 acquires the detection results of the wheel speed sensors 22 through the brake system 18. The brake system 18 can detect, for example, locking of a brake, spinning of any of the wheels 3, or a sign of skidding from, for example, a difference in rotation between the right and left wheels 3 based on the detection results of the wheel speed sensors 22, and can perform various types of control.

For example, the configurations, the arrangements, and the electrical connection configurations of the sensors and actuators described above are mere examples, and can be set (modified) in various ways.

The ECU 14 implements the parking assist device as one of various control devices. As an example, the ECU 14 uses the imagers 15 to image the surrounding area of the vehicle 1 while the vehicle 1 is moving slowly. The ECU 14 detects a target parking position serving as an area allowing the vehicle 1 to park from a captured image obtained by the imagers 15. At this time, a relation between the target parking position and the position of the vehicle 1 is represented using relative coordinates.

Conventionally, while the vehicle 1 is moving, the coordinates representing the target parking position also move with the movement of the vehicle, and deviate from coordinates of a position where the original target parking position has been recognized. As a result, if the parking assist is performed from a position (current position) into which the vehicle has moved, the vehicle is guided to the deviated coordinates (target parking position deviated with the movement of the vehicle). That is, the final parking completion position differs from the position where the captured image was captured (parking position to which the driver recognized to be guided). To reduce the deviation in the guided position, conventionally a request for the parking assist is permitted on condition that the vehicle is stopped once.

Thus, in the parking assist system 100 of the present embodiment, if the vehicle 1 is traveling, for example, at a low speed, during a period after the captured image (image over which, for example, a parking frame image is superimposed) was displayed on the display device 8 and before the next captured image is displayed (captured), the target parking position (position having relative coordinates) when the captured image for the current position of the vehicle 1 is displayed is identified. For example, the target parking position (position having relative coordinates) when the captured image for the current position of the vehicle 1 is displayed is identified based on the moving amount by which the vehicle 1 has moved and the positional relation (relative position) between the vehicle 1 and the target parking position when the captured image was captured. If a request for starting the parking assist is made, for example, through an operation unit 14g provided as an input device, the guidance (parking assist) of the vehicle 1 is performed based on the target parking position identified in the current position of the vehicle 1. As a result, even if the parking assist is started during the low speed movement, the vehicle 1 can be guided to the target parking position with little deviation from the originally recognized position.

Figure 4:
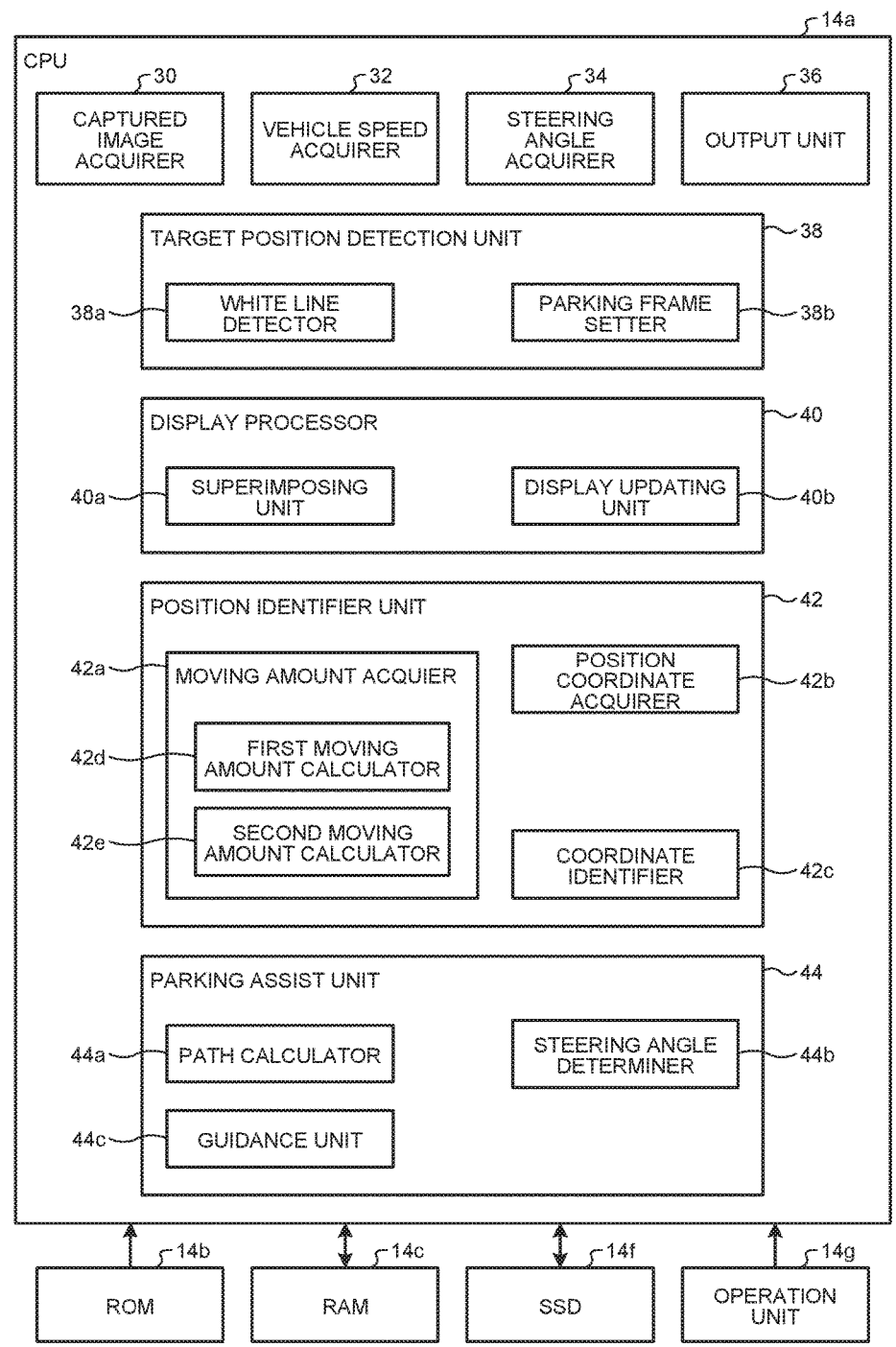
FIG. 4 is a block diagram illustrating a configuration of a control unit implemented in a central processing unit (CPU) of the parking assist device according to the embodiment.

The CPU 14a included in the ECU 14 includes a plurality of modules that are implemented by reading and executing the program installed and stored in the storage device, such as the ROM 14b, in order to execute, for example, the correction (identification) processing of the target parking position as described above. For example, as illustrated in FIG. 4, the CPU 14a includes, for example, a captured image acquirer 30, a vehicle speed acquirer 32, a steering angle acquirer 34, an output unit 36, a target position detector 38 (detector), a display processing unit 40 (display unit), a position identifier 42, and a parking assist unit 44.

Figure 5:
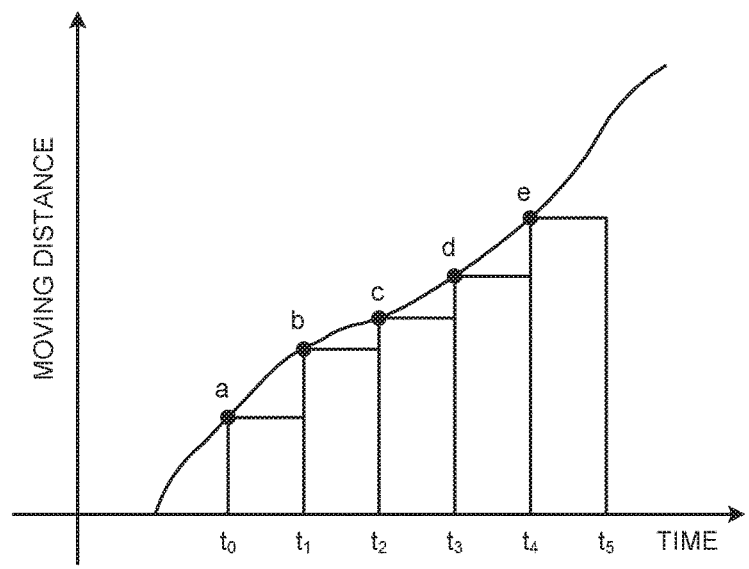
FIG. 5 is an explanatory diagram explaining timing of capture to search for a target parking position according to the embodiment.

The captured image acquirer 30 acquires (captures), at certain intervals through the display controller 14d, the captured image data output from the imagers 15 that are provided on the vehicle 1 and image the periphery of the vehicle 1. Arithmetic processing is performed on the captured images. FIG. 5 is a diagram illustrating relations among capture timing of the captured image acquirer 30, the moving distance of the vehicle 1, and the period of use of the captured image that was captured in the vehicle 1 moving at a low speed. For example, the captured image acquirer 30 sequentially captures the captured image at the certain intervals (for example, at intervals of 100 ms). Accordingly, a captured image at the periphery of the vehicle 1 in a vehicle position a is acquired at time t0, and another captured image at the periphery of the vehicle 1 in a vehicle position b is acquired at time t1. That is, during an interval from time t0 to time t1, the captured image data captured at time t0 is used for, for example, calculation of the coordinates and display processing. The captured image data acquired at time t1 can be used at time t1 and later. Consequently, for example, a peripheral image of the vehicle position a is displayed as a still image between time t0 and time t1. In this case, the image processing only needs to be intermittently performed at certain intervals, and the deviation in the target parking position (to be described later) is corrected during each of the intervals. As a result, accuracy of the parking assist (guidance of the vehicle) can be improved while the load of the arithmetic processing is reduced. The same applies to intervals of time t1 to time t2 and time t2 to t3.

The vehicle speed acquirer 32 calculates the vehicle speed of the vehicle 1 based on detected values detected by the wheel speed sensors 22, and performs various types of control. The vehicle speed acquirer 32 determines the current vehicle speed of the vehicle 1, for example, based on the smallest detected value among the detected values detected by the four wheel speed sensors 22 provided corresponding to the wheels 3.

The steering angle acquirer 34 acquires information on the state of the steering unit 4 (steering wheel) output from the steering angle sensor 19. If the driver operates the steering unit 4, the steering angle acquirer 34 acquires information indicating the steering intention of the driver. If the steering unit 4 is automatically operated during the parking assist, the steering angle acquirer 34 acquires a feedback value of the automatic steering.

The output unit 36 outputs the content of the assist (such as a parking path and guidance information for guidance therealong) determined by the parking assist unit 44 to the display controller 14d and the voice controller 14e.

The target position detector 38 includes, for example, a white line detector 38a and a parking frame setter 38b. The white line detector 38a uses a known method, such as edge processing, binarization processing, or brightness determination processing, to detect (extract) white lines included in the captured image indicating the perimeter of the vehicle 1 captured through the captured image acquirer 30. The white line detector 38a can appropriately change settings, such as a threshold value, to detect not only the while lines, but also lines indicated in yellow or another color and lines indicated by ropes or the like, as lines indicating a sectioned area.

The parking frame setter 38b determines whether an area lying between a pair of white lines among the white lines detected by the white line detector 38a is an area allowing the vehicle 1 (own vehicle) to park by comparing the area lying between the pair of white lines with data representing, for example, the width and the length in the front-rear direction of the own vehicle stored in, for example, the ROM 14b. If the area lying between the pair of white lines is the area (has a space) allowing parking, the parking frame setter 38b regards the area lying between the pair of white lines as a candidate for the target parking position, ands sets a parking frame (parking frame image). The parking frame image is data stored in, for example, the ROM 14b, and is, for example, a rectangular image representing a space (area) required when the vehicle 1 parks.

The display processing unit 40 includes, for example, a superimposing unit 40a and a display updating unit 40b. The superimposing unit 40a displays the parking frame image set by the parking frame setter 38b in a manner superimposing over, for example, an overhead image representing the periphery of the vehicle 1 acquired by the captured image acquirer 30. The overhead image can be created by performing known processes of viewpoint conversion processing and synthesis processing on the captured image data captured by the imagers 15a to 15d. Each time the captured image acquirer 30 captures a new captured image, the display updating unit 40b updates the overhead image based on the captured image, and updates the superimposing state of the parking frame image set by the parking frame setter 38b with respect to the white lines detected by the white line detector 38a.

Figure 6:
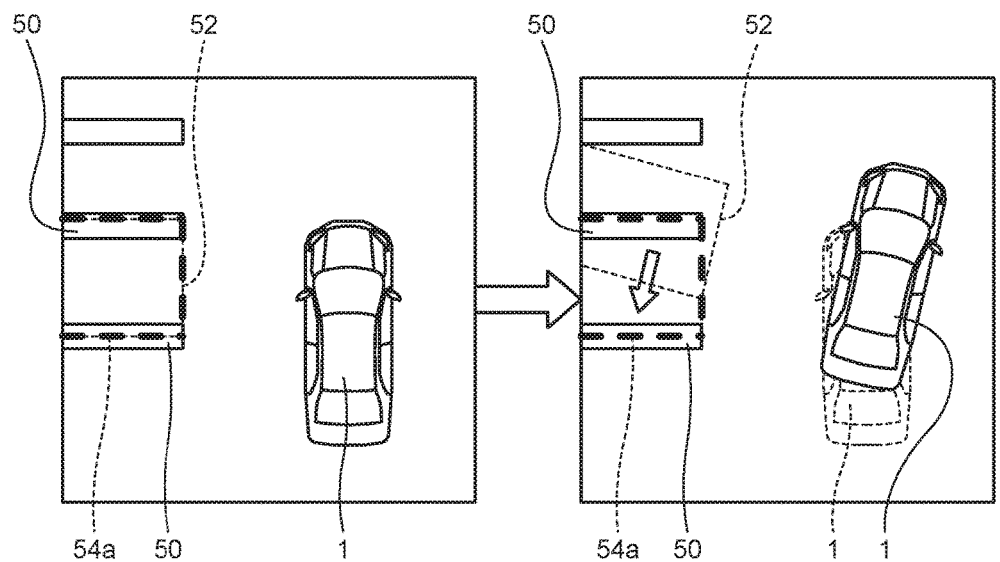
FIG. 6 is a diagram illustrating relations among the target parking position, a parking frame, and the vehicle according to the embodiment as viewed from an overhead viewpoint.

FIG. 6 is a diagram illustrating relations among white lines 50, a target parking position 52, a parking frame 54a, and the vehicle 1 as viewed from an overhead viewpoint. The parking frame 54a is an area corresponding to a parking frame 54 displayed as an overhead image on the display device 8. In the case of FIG. 6, for the sake of explanation, the target parking position 52 is displayed as a frame shape in the same way as the parking frame 54a. The ECU 14, however, defines the target parking position 52 as, for example, coordinates. Accordingly, in the case where the vehicle 1 is guided to the target parking position 52, a reference point (such as a point defined as the central position of a rear wheel axle) of the vehicle 1 is guided to coordinates defined as the target parking position 52. The left side diagram of FIG. 6 illustrates a state in which the captured image acquirer 30 has captured a captured image and the target parking position 52 has been calculated in the position of the vehicle 1 moving at a low speed. In this case, the target parking position 52 is located in substantially the same position as the parking frame 54a. The position (coordinates) of the target parking position 52 with respect to the position of the vehicle 1 is represented by relative coordinates. Consequently, if the vehicle 1 moves to the position (position of the vehicle 1 indicated by solid lines) illustrated in the right diagram of FIG. 6, the target parking position 52 moves (relative coordinates thereof move) with the movement of the vehicle 1. As a result, deviations (coordinate deviations) are generated between the position of the target parking position 52 and the position of the parking frame 54a superimposed over the white lines 50. The position identifier 42 performs processing to correct the deviations in the coordinates of the target parking position 52.

The position identifier 42 includes, for example, a moving amount acquirer 42a, a position coordinate acquirer 42b, and a coordinate identifier 42c. As described above, the captured image acquirer 30 captures, at the certain intervals, the captured image captured by the imagers 15, and the display processing unit 40 updates the overhead image (image over which the parking frame is superimposed) displayed on the display device 8 in a manner corresponding to the capturing intervals. That is, until the next capturing is performed, the display device 8 displays thereon the overhead image (white lines 50) and the parking frame 54 that have been displayed since the time of the previous capturing. If the vehicle 1 moves while the white lines 50 and the parking frame 54 continue to be displayed as the overhead image, the movement involves movement of the target parking position 52 represented by the relative coordinates with respect to the vehicle 1. Thus, if the vehicle 1 has moved before the overhead image (the white lines 50 and the parking frame 54) is updated, the position identifier 42 detects the moving amount, and uses the moving amount to perform correction to return the target parking position 52 that has moved in the relative coordinate system to coordinates of the parking frame 54 (position where the target parking position 52 was recognized at the time of the capturing).

The moving amount acquirer 42a includes, for example, a first moving amount calculator 42d and a second moving amount calculator 42e. The first moving amount calculator 42d calculates a first moving amount by which the vehicle 1 has moved, at a certain processing cycle during a period after the display device 8 has displayed the overhead image over which the parking frame 54 is superimposed and before the display device 8 displays a captured image captured next. In this case, the ECU 14 can calculate the first moving amount by determining the reference (origin) of the absolute coordinate system and acquiring the current coordinates (absolute coordinates) of the vehicle 1 from the origin when the display of the display device 8 is switched to the overhead image, that is, when the display of the display device 8 is switched to a screen for displaying the parking frame image.

In fact, a certain processing time is required from the time when the captured image acquirer 30 captures the captured image until the target position detector 38 detects the target parking position 52 and the display processing unit 40 superimposes the parking frame 54. If the vehicle 1 moves even during this processing time, the target parking position 52 represented by the relative coordinates deviates. For example, if the screen of the display device 8 is switched to display, for example, an overhead image in which the parking frame 54 is not displayed, and if the user recognizes (views) a space (area) that seems to allow parking, the target parking position 52 deviates based on the moving amount of the vehicle 1 until the parking frame 54 is displayed. Thus, the second moving amount calculator 42e of the moving amount acquirer 42a calculates, as a second moving amount, the distance by which the vehicle 1 has moved during the processing cycle for detecting the target parking position 52 from the time when the captured image was captured. In this way, by taking into account the second moving amount in addition to the first moving amount as the moving amount of the vehicle 1, the target parking position 52 can be more accurately calculated when the parking assist is performed. The processing time at this time is a nearly constant time depending on the capacity of the CPU 14a. The second moving amount increases as the moving speed of the vehicle 1 increases. Although the embodiment is an example in which the deviations in the coordinates are corrected using the first moving amount and the second moving amount, either one of the first moving amount and the second moving amount may be used to correct the deviations in the coordinates, and thus, the deviations in the coordinates can be reduced.

Figure 7:
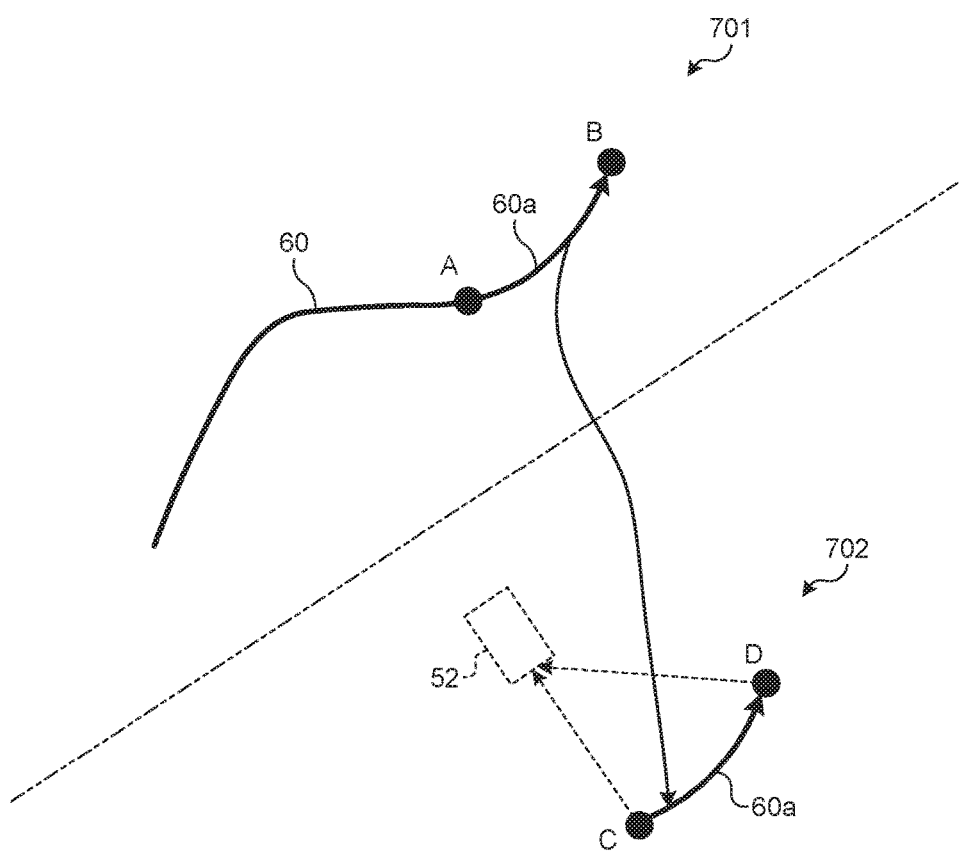
FIG. 7 is a schematic diagram explaining an example of a correction calculation of the target parking position according to the embodiment.

FIG. 7 is a schematic diagram explaining an example of the correction calculation of the target parking position 52, and is a diagram illustrating side by side an absolute coordinate system 701 representing a moving trajectory 60 of the vehicle 1 moving at a low speed and a relative coordinate system 702 representing positions of the vehicle 1 and a position of the target parking position 52. In the absolute coordinate system 701, assuming any position of the vehicle 1 in motion as a reference, the coordinates of the vehicle 1 in motion can be obtained based on the moving amount from the position and the steering angle. The position coordinate acquirer 42b acquires coordinates A (absolute coordinates) of the vehicle 1 at the time when the vehicle 1 has captured the captured image of the periphery thereof and coordinates B (absolute coordinates) of the vehicle 1 at the time when a request for starting the parking assist (request for guiding the vehicle 1 to the target parking position 52) has been made, for example, through the operation unit 14g, as the current position of the vehicle 1. The relative coordinate system 702 is a coordinate system representing the relation (positional relation) between the vehicle and the target parking position. The position coordinate acquirer 42b of the present embodiment acquires the positional relation based on the parking frame (position corresponding to the target parking position) shown in the captured image. The position coordinate acquirer 42b acquires the coordinates (relative coordinates) of the target parking position 52 with respect to the position of the vehicle 1 at the time when the captured image was captured. This allows the position (coordinates C) of the vehicle 1 to be identified with respect to the target parking position 52. The coordinate identifier 42c calculates coordinates D (relative coordinates) representing the relative relation between the current position of the vehicle 1 and the target parking position 52 at the time when the captured image was captured based on the coordinates A, B, and C and the positional relation between the vehicle 1 and the target parking position 52 at the time when the coordinate C was acquired. In this case, the coordinate identifier 42c carries out known calculation methods, such as rotation processing and movement processing of the coordinates, to calculate the coordinates D. Schematically, as illustrated in FIG. 7, the position (coordinates D) of the vehicle 1 with respect to the target parking position 52 can be calculated (identified) by cutting a segment, namely, a partial moving trajectory 60a defined by the coordinates A and B, performing thereon the rotation processing and the movement processing, and connecting the partial moving trajectory 60a to the coordinates C.

The parking assist unit 44 includes, for example, a path calculator 44a, a steering angle determiner 44b, and a guidance unit 44c. If a request for guiding the vehicle 1 to the target parking position 52 is made through, for example, the operation unit 14g, the path calculator 44a calculates an optimal guide path for guiding the vehicle 1 from the current position thereof to the target parking position 52 identified by the coordinate identifier 42c. In this case, the path calculator 44a determines the guide path according to the constantly changing state of the surrounding area of the vehicle 1, such as the state of presence of other vehicles, pedestrians, and the like. The steering angle determiner 44b calculates the steering angle for moving the vehicle 1 along the determined guide path. The guidance unit 44c guides the operation of the gear shift operation unit 7 (shift lever) (switching to the D position or the R position), and guides the operation amount of the acceleration operation unit 5 (accelerator pedal) so that the user (driver) can move the automatically steered vehicle 1 along the guide path. In addition, the guidance unit 44c performs guidance, such as providing reminders, based on the safety check of the surrounding area and the surrounding state, using, for example, voice guidance through the voice output device 9 and display via the display device 8. As the parking assist in the present embodiment, an example will be illustrated in which the CPU 14a performs the automatic steering, and the user performs the other operations according the guidance by the guidance unit 44c. The parking assist is, however, not limited to this example. For example, the CPU 14a may automatically control the operation of the acceleration operation unit 5, in addition to performing the steering. In the same way, the gear shift operation unit 7 may be automatically operated.

In this way, the relative relation of the target parking position 52 is calculated (corrected) with respect to the current position of the vehicle 1, such as the position of the vehicle 1 at the time when the request for guiding the vehicle 1 to the target parking position 52 has been made. As a result, the parking assist unit 44 can accurately acquire the position (coordinates D) of the target parking position 52 with respect to the current position of the vehicle 1 at the time when the captured image acquirer 30 has captured the captured image, and can more accurately guide the vehicle 1 to the position allowing parking recognized on the display device 8 by the user.

Figure 8:
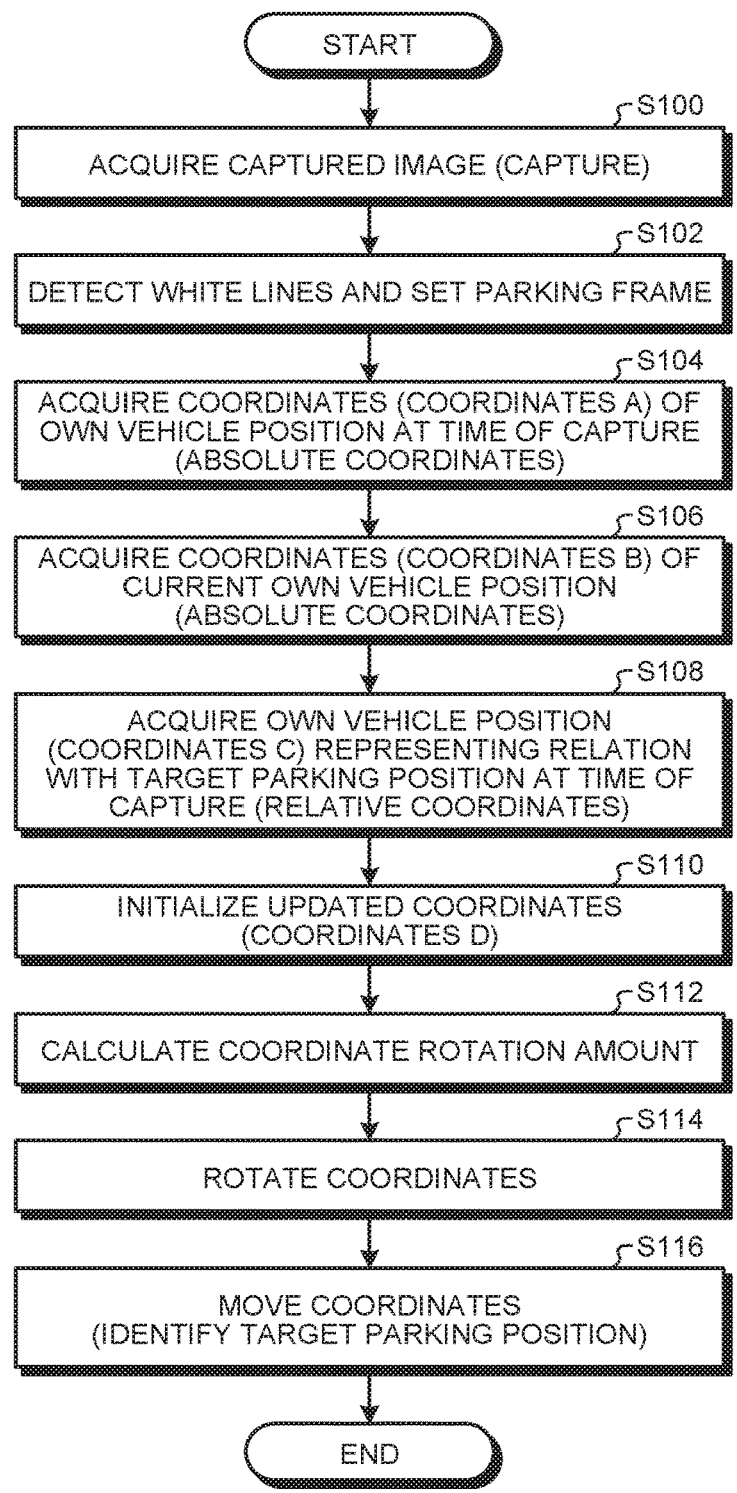
FIG. 8 is a flowchart illustrating a procedure of recognition processing (coordinate correction processing) of the target parking position according to the embodiment.
Figure 9:
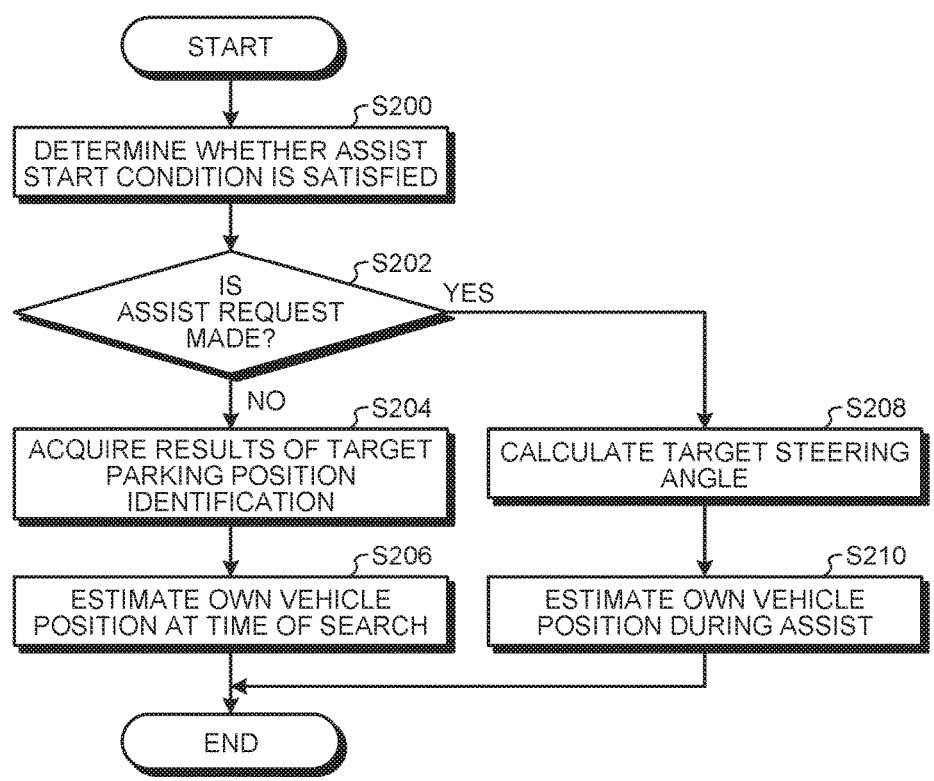
FIG. 9 is a flowchart illustrating a procedure of control processing of a parking assist according to the embodiment.

The following describes an example of the recognition processing (correction processing) of the coordinates of the target parking position 52, and an example of the control processing of the parking assist performed by the parking assist system 100, using FIGS. 8 and 9. A first processing flow illustrated in FIG. 8 for searching for the area allowing parking and identifying the target parking position 52 is repeatedly executed at intervals of, for example 20 ms. A second processing flow illustrated in FIG. 9 for performing the parking assist is repeatedly executed at shorter intervals of, for example 10 ms.

First, if the vehicle 1 has entered a parking lot area or the like using, for example, information provided by the navigation system or the like and has reached a certain speed or lower (such as 10 km/h or lower), the ECU 14 automatically or manually starts a search mode for an area allowing parking, and the captured image acquirer 30 captures a captured image (S100). Subsequently, the white line detector 38a extracts white line portions from the captured image thus captured, and the parking frame setter 38b extracts the target parking position 52 as an area allowing the vehicle 1 to park from areas each lying between a pair of white lines among the detected white lines, and set the parking frame 54 (S102).

Subsequently, the position coordinate acquirer 42b acquires the coordinates A (absolute coordinates) of the vehicle 1 at the time when the vehicle 1 has captured the captured image of the periphery thereof (S104). The position coordinate acquirer 42b acquires the coordinates B (absolute coordinates) representing the current position of the vehicle 1 (S106). The current position of the vehicle 1 can be acquired based on, for example, the time elapsed from the time when the captured image was captured, the vehicle speed, the steering direction, and the like. The current position of the vehicle 1 can also be acquired as a position in absolute coordinates at the time when the request for starting the parking assist (request for guiding the vehicle 1 to the target parking position 52) has been made. In the present embodiment, the coordinates A and B are obtained from estimation results obtained through the second processing flow that is carried out faster than the first processing flow.

Moreover, the position coordinate acquirer 42b acquires the coordinates C (relative coordinates) representing the positional relation between the vehicle 1 and the target parking position 52 at the time when the captured image was acquired as a relation between the vehicle 1 and the target parking position 52 (S108).

Subsequently, the coordinate identifier 42c performs initialization of the information on the coordinates D (initialization of updated coordinates) that has been corrected in the previous identification processing of the target parking position 52 (S110). To eliminate the deviations in coordinate system between the absolute coordinates representing the position of the vehicle 1 and the relative coordinates representing the positional relation between the vehicle 1 and the target parking position 52, the coordinate identifier 42c calculates a rotation amount θ between the coordinate systems (S112). In this case, the rotation amount θ can be calculated using a known method. For example, the rotation amount θ can be calculated by obtaining a difference (diff_θ) between the coordinates A in the absolute coordinate system 701 and the coordinates C in the relative coordinate system 702 illustrated in FIG. 7. In this case, an expression diff_θ=coordinates C(θ)−coordinates A(θ) holds. The coordinate identifier 42c rotates the partial moving trajectory 60a defined by the coordinates A and the coordinates B illustrated in FIG. 7 (S114). The rotation of the coordinates can also be performed using a known method. In this case, the X-coordinate and the Y-coordinate are rotated.

Point D_tem(x)=(Point B(x)−Point A(x)*cos(diff_θ))−
(Point B(y)−Point A(y)*sin(diff_θ))

Point D_tem(y)=(Point B(x)−Point A(x)*sin(diff_θ))+
(Point B(y)−Point A(y)*cos(diff_θ))

Point D_tem(θ)=Point B(θ)−Point A(θ)

The coordinate identifier 42c moves the coordinates using Point D_tem(x), Point D_tem(y), and Point D_tem(θ) that have been calculated, and identifies the coordinates D (relative coordinates) representing the relative relation between the current position of the vehicle 1 and the target parking position 52 at the time when the captured image was captured (S116).

Point D(x)=Point D_tem(x)+Point C(x)

Point D(y)=Point D_tem(y)+Point C(y)

Point D(θ)=Point D_tem(θ)+Point C(θ)

Subsequently, the procedure of the parking assist control will be described using FIG. 9. During the search mode for the area allowing parking, the parking assist unit 44 is constantly performing determination processing as to whether a parking assist start condition is satisfied (S200). The parking assist start condition is a condition for determining whether the guidance by the automatic steering may be started, and is, for example, a condition as to whether the vehicle speed is sufficiently low (for example, at a vehicle speed of 1 km/h to 2 km/h, or lower), or whether no abnormality is present in various sensors and various actuators. If the parking assist start condition is not satisfied in the start condition determination processing, that is, if, for example, the vehicle speed is not sufficiently low or if any abnormality is present in a sensor, the parking assist unit 44 invalidates any input to the operation unit 14g for receiving operations for requesting the parking assist, and suspends the parking assist.

If the parking assist start condition is satisfied, the parking assist unit 44 determine whether an assist request is made through, for example, the operation unit 14g (S202). If the assist request is not made through the operation unit 14g (No at S202), the parking assist processing is in the state of searching for the parking frame 54 allowing parking. If the assist request is made through the operation unit 14, the parking assist processing is in the state of being ready to perform the guidance. Hence, the parking assist unit 44 acquires the results of identification of the target parking position 52 in the recognition processing of the coordinates of the target parking position 52 illustrated in FIG. 8 (S204). In this case, the parking assist unit 44 can calculate at any time the guide path for guiding the vehicle 1 from the current position to the corrected target parking position 52 by acquiring the information on the corrected accurate target parking position 52 (coordinates D). That is, a preparation for the guidance can be made even while the vehicle 1 is moving at a low speed. Since the display processing unit 40 superimposes the parking frame 54 over the captured image that was captured and displays the result on the display device 8, the corrected target parking position 52 is basically matched with the parking frame 54 at this time. Consequently, a state is established in which the vehicle 1 can be guided to the parking position (such as the position of the parking frame 54) recognized by the user through the display on the display device 8.

Since it is considered that the vehicle 1 is moving at a low speed when the vehicle 1 is searching for the parking frame 54 allowing parking, the position identifier 42 performs estimation of the position of the vehicle 1 (own vehicle) in the absolute coordinate system based on the steering angle information acquired by the steering angle acquirer 34 and the moving amount calculated by the moving amount acquirer 42a (S206). That is, the position identifier 42 estimates (acquires) the position (coordinates A serving as absolute coordinates) of the vehicle 1 at the time when the vehicle 1 captured the captured image of the periphery thereof and the current position (absolute coordinates) of the vehicle 1, in which the positions are used in the first processing flow for searching for the area allowing parking and identifying the target parking position 52. Regarding the current position (absolute coordinates) of the vehicle 1, if the guidance request is made, the absolute coordinates at the time of the guidance request is treated as the coordinates B.

If the parking assist start condition is satisfied, and if, at S202, the assist request is made through, for example, the operation unit 14g (Yes at S202), the parking assist unit 44 starts, in the current position of vehicle 1, to guide the vehicle 1 to the identified (corrected) target parking position 52. In this case, the steering angle determiner 44b calculates a target steering angle so as to move the vehicle 1 along the guide path (path for guidance to the corrected target parking position 52) calculated at S204 (S208). The guidance unit 44c guides the operation of the gear shift operation unit 7 (shift lever) and guides the operation amount of the acceleration operation unit 5 (accelerator pedal) so that the user can move the vehicle 1 along the guide path at the calculated target steering angle. The position identifier 42 sequentially estimates the position of the vehicle 1 (own vehicle) during the parking guidance (S210), and feeds the result back to the steering angle determiner 44b and the guidance unit 44c to reflect the result in the control.

Figure 10:
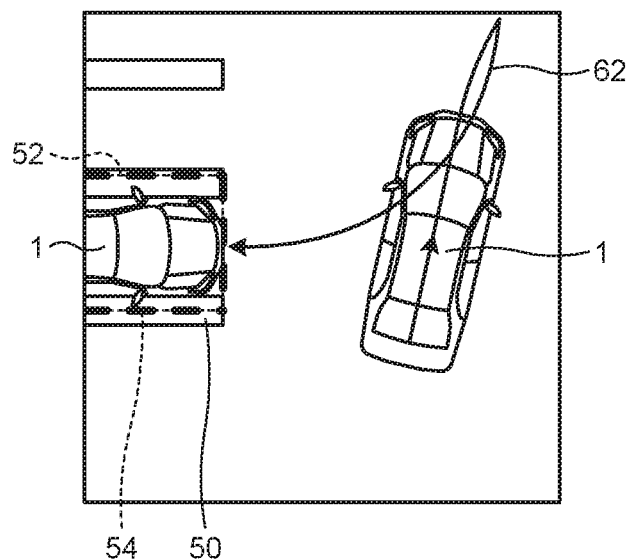
FIG. 10 is a schematic diagram illustrating an example of a state in which the vehicle is assisted to be guided to the target parking position identified by the parking assist device according to the embodiment.
Figure 11:
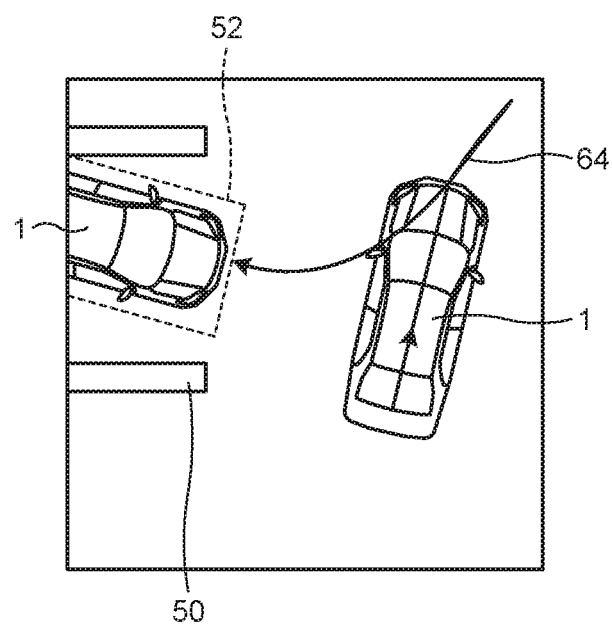
FIG. 11 is a schematic diagram explaining an example of a state in which the vehicle is assisted to be guided in the case where the target parking position is not identified by the parking assist device according to the embodiment.

Repeated execution of the above-described first processing flow illustrated in FIG. 8 and the above-described second processing flow illustrated in FIG. 9 corrects the target parking position 52 so as to be substantially matched with the parking frame 54 set in the parking area defined by the white lines 50, as illustrated in FIG. 10. As a result, a guide path 62 for guiding the vehicle 1 to the corrected target parking position 52 is accurately set, and the vehicle 1 can be accurately guided to the parking position recognized by the user based on the overhead image that was obtained by capturing the captured image including the parking area and that is displayed on the display device 8. FIG. 11 is a diagram illustrating, as a comparative example, an example of guidance by a guide path 64 in the case where the target parking position 52 is not corrected along with the movement of the vehicle 1. In this case, the target parking position 52 represented by the relative coordinates with respect to the moving vehicle 1 deviates with the movement of the vehicle 1. This causes the guide path 64 to be set for the deviated target parking position 52, and reduces the accuracy of guidance of the vehicle 1 to the parking position recognized by the user based on the overhead image that was obtained by capturing the captured image including the parking area and that is displayed on the display device 8, in some cases. As a result, if the target parking position 52 is not corrected along with the movement of the vehicle 1, the parking assist cannot be started unless the deviation of the target parking position 52 is eliminated by bringing the vehicle 1 to a full stop. In contrast, in the case of the parking assist system 100 of the present embodiment, since the relative coordinates between the target parking position 52 and the vehicle 1 (own vehicle) are sequentially corrected even while the vehicle 1 is moving, the accurate relative coordinates can be acquired without stopping the vehicle 1, and more accurate parking assist can be performed based on the coordinates thus acquired. The system using the captured image captured by the imagers 15 as in the present embodiment is higher in accuracy of detection of the surrounding state of the vehicle 1 and higher in accuracy of detection of the target position, although lower in real-time capabilities, than, for example, a system, such as a sonar, that is capable of detecting the target position in real time. That is, the system using the captured image captured by the imagers 15 as in the present embodiment can accurately acquire the surrounding state of the vehicle 1 in motion by using the captured image intermittently provided at certain intervals. The deviation in the target parking position can be corrected by the arithmetic processing using the captured image during each of the certain intervals at which the captured image is provided. As a result, the arithmetic processing using the image representing the accurate surrounding state can be performed even while the vehicle 1 is traveling, and the accuracy of the parking assist (guidance of the vehicle) from the current position of the vehicle 1 to the target parking position at the time when the captured image was captured can be improved. In this way, the parking assist system 100 of the present embodiment is improved in usability from conventional systems that require the vehicle 1 to stop.

Figure 12:
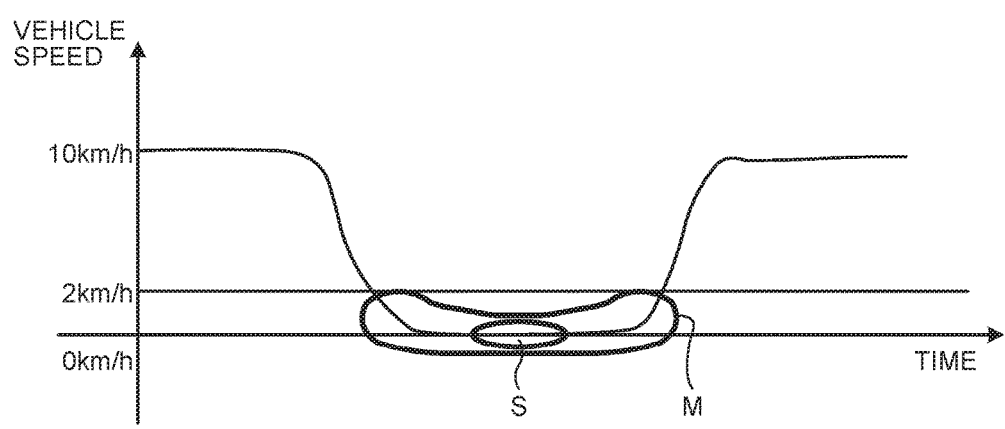
FIG. 12 is an explanatory diagram illustrating that use of the parking assist device according to the embodiment increases a period in which the parking assist can be performed to be longer than that of a conventional system.

In the case of the parking assist system 100 of the present embodiment, the target parking position 52 is sequentially corrected based on the moving amount of the vehicle 1 even when the vehicle 1 is traveling at a low speed (for example, at a speed of 1 km/h to 2 km/h). Consequently, as illustrated in FIG. 12, in contrast to the conventional systems that are incapable of starting the parking assist except in a stopping zone S, the parking assist can be started even in a low-speed traveling zone M including the stopping zone S. As a result, even if, for example, a following vehicle is present, the parking assist can be quickly started, and smoother guidance can be performed.

Even if the vehicle 1 starts the parking assist while traveling at a low speed, the accurate target parking position 52 is calculated through the sequential correction of the target parking position 52 based on the moving amount of the vehicle 1. As a result, the number of times of attitude correction of the vehicle 1 by switching between forward and reverse movements, which may be performed during the parking guidance, can be reduced, or the switching between forward and reverse movements can be made unnecessary. Thus, smoother parking assist and reduction in time of the parking assist can be achieved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A parking assist device comprising:
   a detector configured to detect a target parking position from a captured image obtained from an imager, the target parking position indicating an area allowing a vehicle to park, the imager imaging a surrounding area of the vehicle while the vehicle is moving;
   a display unit configured to display the captured image on a display device;
   a position identifier configured to identify, during a period while the vehicle is moving after the captured image was displayed on the display device and before a captured image captured next by the imager is displayed, the target parking position with respect to a current position of the vehicle, based on a first moving amount by which the vehicle has moved since the captured image was displayed on the display device and on a positional relation between the vehicle and the target parking position at the time when the captured image was captured; and a parking assist unit configured to calculate a guide path based on the first moving amount and guide the vehicle during the period based on the identified target parking position when a request for guiding the vehicle to the target parking position is made.

2. The parking assist device according to claim 1, wherein the position identifier is configured to add a second moving amount by which the vehicle has moved during a processing cycle from the time when the captured image was captured until the target parking position is detected to the first moving amount to identify the target parking position.

3. The parking assist device according to claim 1, wherein the detector is configured to acquire the target parking position from the captured image captured by the imager at certain intervals while the vehicle is moving.

4. A parking assist device comprising:

a detector configured to detect a target parking position from a captured image obtained from an imager, the target parking position indicating an area allowing a vehicle to park, the imager imaging a surrounding area of the vehicle while the vehicle is moving;

a display unit configured to display the captured image on a display device;

a position identifier configured to identify, during a period while the vehicle is moving after the captured image was displayed on the display device and before a captured image captured next by the imager is displayed, the target parking position with respect to a current position of the vehicle, based on a second moving amount by which the vehicle has moved during a processing cycle from the time when the captured image was captured until the target parking position is detected and on a positional relation between the vehicle and the target parking position at the time when the captured image was captured; and a parking assist unit configured to calculate a guide path based on the second moving amount and guide the vehicle during the period based on the identified target parking position when a request for guiding the vehicle to the target parking position is made.

* * * * *